United States Patent
Xu et al.

(10) Patent No.: US 10,348,401 B2
(45) Date of Patent: *Jul. 9, 2019

(54) VISIBLE LIGHT SIGNAL RECEIVING AND CONTROL METHOD, CONTROL APPARATUS, AND RECEIVING DEVICE

(71) Applicant: BEIJING ZHIGU RUI TUO TECH CO., LTD., Beijing (CN)

(72) Inventors: Ran Xu, Beijing (CN); Lin Du, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/525,461

(22) PCT Filed: Oct. 10, 2015

(86) PCT No.: PCT/CN2015/091613
§ 371 (c)(1),
(2) Date: May 9, 2017

(87) PCT Pub. No.: WO2016/074547
PCT Pub. Date: May 19, 2016

(65) Prior Publication Data
US 2017/0317747 A1 Nov. 2, 2017

(30) Foreign Application Priority Data

Nov. 14, 2014 (CN) .......................... 2014 1 0645929

(51) Int. Cl.
*H04B 10/116* (2013.01)
*H04B 10/079* (2013.01)
(52) U.S. Cl.
CPC ..... *H04B 10/116* (2013.01); *H04B 10/07953* (2013.01)

(58) Field of Classification Search
CPC ............... H04B 10/116; H04B 10/676; H04B 10/07953
(Continued)

(56) References Cited

U.S. PATENT DOCUMENTS 8,311,414 B2   11/2012   Niiho et al.
9,697,619 B2 *  7/2017   Breuer .................... G01C 3/08
(Continued)

FOREIGN PATENT DOCUMENTS

CN   101490985   7/2009
CN   103327317   9/2013
(Continued)

OTHER PUBLICATIONS

International Search Report and Written Opinion for Application No. PCT/CN2015/091613, dated Jan. 20, 2016, 8 pages.
(Continued)

*Primary Examiner* — Juan A Torres
(74) *Attorney, Agent, or Firm* — Sheppard Mullin Richter & Hampton LLP

(57) ABSTRACT

Embodiments of the present application provide a visible light signal receiving and control method, a control apparatus, and a receiving device. The method comprises: determining a communication performance between a visible light signal receiving device and at least one visible light signal transmit device; and in response to a reduction of the communication performance between the visible light signal receiving device and the at least one visible light signal transmit device, using a first logic pixel unit of an image sensor related to the at least one visible light signal transmit device as at least two second logic pixel units for reading separately when reading inductive charges of the image sensor of the visible light signal receiving device. The method, apparatus, and device of the embodiments of the
(Continued)

S120 — Determine a communication performance between a visible light signal receiving device and at least one visible light signal transmit device S140 — In response to a reduction in the communication performance between the visible light signal receiving device and the at least one visible light signal transmit device, take a first logic pixel unit of the image sensor related to the at least one visible light signal transmit device as at least two second logic pixel units to read separately, when reading inductive charges of an image sensor of the visible light signal receiving device present application are capable of compensating reduction of a communication performance to some extent by changing the charge readout mode of an image sensor of a visible light signal receiving device, and are more suitable for visible light communications in complicated mobile scenarios.

27 Claims, 7 Drawing Sheets

(58) Field of Classification Search
USPC .......................................................... 398/26
See application file for complete search history.

(56) References Cited

U.S. PATENT DOCUMENTS

| | | |
|---|---|---|
| 2010/0147956 A1 | 6/2010 | Wang et al. |
| 2012/0230703 A1* | 9/2012 | Yamada ............... H04B 10/116 398/172 |
| 2013/0251374 A1 | 9/2013 | Chen et al. |
| 2016/0323035 A1* | 11/2016 | Jovicic ............... H04B 10/0795 |

FOREIGN PATENT DOCUMENTS

| | | |
|---|---|---|
| CN | 104378163 | 2/2015 |
| CN | 104393931 | 3/2015 |
| WO | 2012/132333 | 10/2012 |

OTHER PUBLICATIONS

Ashok et al., "Challenge: Mobile Optical Networks Through Visual MIMO," Proceedings of the 16$^{th}$ Annual International Conference on Mobile Computing and Networking, ACM, 2010, p. 105-112.

\* cited by examiner

VISIBLE LIGHT SIGNAL RECEIVING AND CONTROL METHOD, CONTROL APPARATUS, AND RECEIVING DEVICE

RELATED APPLICATION

This application is a National Phase Application of International Application No. PCT/CN2015/091613, filed on Oct. 10, 2015, which claims the benefit of priority to Chinese Patent Application No. 201410645929.X filed on Nov. 14, 2014 and entitled "VISIBLE LIGHT SIGNAL RECEIVING AND CONTROL METHOD, CONTROL APPARATUS, AND RECEIVING DEVICE", each of which is incorporated by reference herein in its entirety.

TECHNICAL FIELD

All embodiments of the present application relate to the field of visible communications technologies, and in particular, to a visible light signal receiving and control method, a control apparatus, and a receiving device.

BACKGROUND

Visible light communications (VLC) refer to wireless light communication technologies that use light in the visible light wave band as a carrier of information transmission and transmit information by using high-speed, light-and-shade flashing light signals emitted by a light source and imperceptible to naked eyes. It has advantages of high transmit power, no electromagnetic interference, no spectrum authentication, green and environmentally-friendly, can effectively ease the problem that radio spectrum frequency resources become exhausted, and gain more and more attention in recent years.

With the development of mobile communications technologies, more and more visible light communications technologies are applied in mobile scenarios. Because visible light sending and receiving devices are all likely to move and because of a complicated transmission environment of mobile communications, performances of communications among visible light sending and receiving devices in the mobile scenarios are likely to be affected.

SUMMARY

In view of the above, one example, of no-limiting objective of embodiments of the present application is to provide a visible light communications solution in a mobile scenario.

To achieve the foregoing objective, in a first aspect of the embodiments of the present application, provided is a visible light signal receiving and control method, comprising:

determining a communication performance between a visible light signal receiving device and at least one visible light signal transmit device;

in response to a reduction in the communication performance between the visible light signal receiving device and the at least one visible light signal transmit device, taking a first logic pixel unit of an image sensor related to the at least one visible light signal transmit device as at least two second logic pixel units to read separately when reading an inductive charge of the image sensor of the visible light signal receiving device, each of the first logic pixel units comprising the at least two second logic pixel units, and each of the at least two second logic pixel units comprising at least one physical pixel unit of the image sensor.

In a second aspect of the embodiments of the present application, provided is a visible light signal receiving and control apparatus, comprising:

a determining module, configured to determine a communication performance between a visible light signal receiving device and at least one visible light signal transmit device;

a control module, configured to, in response to a reduction in the communication performance between the visible light signal receiving device and at least one of the at least one visible light signal transmit device, use one first logic pixel unit of an image sensor related to the at least one visible light signal transmit device as at least two second logic pixel units to read separately when reading an inductive charge of the image sensor of the visible light signal receiving device; and wherein each of the first logic pixel units comprises at least two of the second logic pixel units, and each of the second logic pixel units comprises at least one physical pixel unit of the image sensor.

In a third aspect of the embodiments of the present application, provided is a visible light signal receiving device, wherein the device comprises the visible light signal receiving and control apparatus of the second aspect of the embodiments of the present application.

In a fourth aspect of the embodiments of the present application, provided is a computer readable storage device, comprising at least one executable instruction, which, in response to execution, causes a system comprising a processor to perform operations, comprising:

determining communication performance between a visible light signal receiving device and at least one visible light signal transmit device;

in response to a reduction in the communication performance between the visible light signal receiving device and the at least one visible light signal transmit device, taking a first logic pixel unit of an image sensor related to the at least one visible light signal transmit device as at least two second logic pixel units to read separately, when reading an inductive charge of the image sensor of the visible light signal receiving device, each of the first logic pixel units comprising the at least two second logic pixel units, and each of the at least two second logic pixel units comprising at least one physical pixel unit of the image sensor.

In a fifth aspect of the embodiments of the present application, provided is a device for visible light signal receiving and control comprising a processor and memory, wherein the memory storing a computer executable instruction, the processor being connected with the memory via a communication bus, and when the device is operating, the processor executes or facilitates execution of the executable instructions stored by the memory:

determining a communication performance between a visible light signal receiving device and at least one visible light signal transmit device;

in response to a reduction in the communication performance between the visible light signal receiving device and the at least one visible light signal transmit device, taking a first logic pixel unit of an image sensor related to the at least one visible light signal transmit device as at least two second logic pixel units to read separately, when reading an inductive charge of the image sensor of the visible light signal receiving device, each of the first logic pixel units comprising the at least two second logic pixel units, and each of the at least two second logic pixel units comprising at least one physical pixel unit of the image sensor.

The method, apparatus, and device of the embodiments of the present application are capable of compensating reduction in a communication performance to some extent by changing the charge readout mode of an image sensor of a visible light signal receiving device, and are more suitable for visible light communications in complicated mobile scenarios.

DETAILED DESCRIPTION

Specific implementations of the present application are further described in detail below with reference to the accompanying drawings and embodiments. The following embodiments are intended to describe the present application, but not to limit the scope of the present application.

It should be understood by a person skilled in the art that the terms such as "first" and "second" in the present application are only used for distinguishing different devices, modules, or parameters, and they neither represent any specific technical meanings, nor represent a necessary logic sequence of the devices, modules, or parameters.

The visible light communications technologies use light in the visible light wave band as an information carrier and are physically implemented in two parts, namely, a visible light signal transmitting part and visible light signal receiving part. The visible light signal transmitting part, that is, the visible light signal transmit device in the embodiments of the present application, comprises: an input and processing circuit that converts a to-be-sent signal into an electric signal suitable for being transmitted by a light channel, and a visible-light light source driving and modulating circuit that modulates an electric signal change into the strength change of light carrier wave. The visible light signal receiving part, that is, the visible light signal receiving device in the embodiments of the present application, comprises: an optics system that is capable of implementing an optimal receiving of a signal light source, a light-electric conversion part that reverts a light signal to an electric signal and a front-end amplifying circuit, and a signal processing and output circuit that converts an electric signal into a signal capable of being identified by a terminal. In the embodiments of the present application, the light-electric conversion part of the visible light signal receiving device is an image sensor (also referred to as a photosensitive element, such as a Charge Coupled Device (CCD), or a Complementary Metal-Oxide Semiconductor (CMOS)). The image sensor converts light into inductive charges upon receiving light irradiation, is capable of simultaneously receiving light from light sources of a plurality of visible light signal transmit device, and has a stronger anti-interference capability. The image sensor consists of a plurality of pixels, which is referred to as "physical pixel unit" in the embodiments of the present application and is a minimal physical unit of the image sensor.

Figure 1:
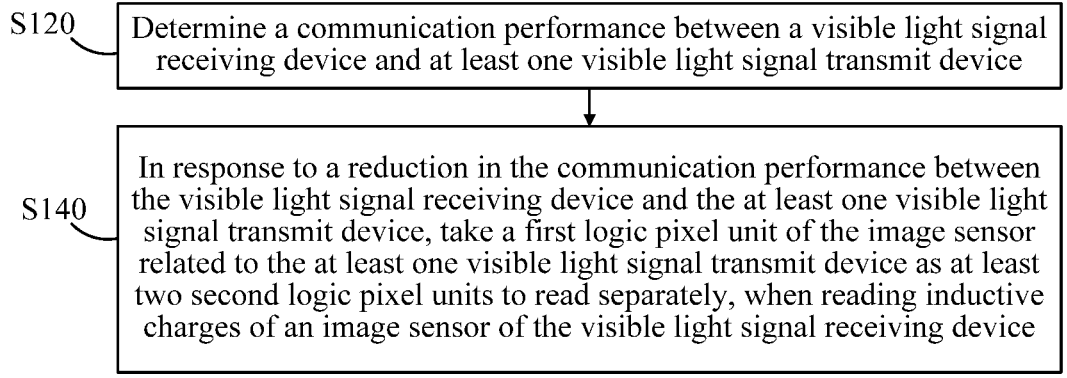
FIG. 1 is an example flowchart of a visible light signal receiving and control method of an embodiment of the present application.

As shown in FIG. 1, the visible light signal receiving and control method of the embodiments of the present application comprises:

S120: Determine a communication performance between a visible light signal receiving device and at least one visible light signal transmit device.

Figure 2A:
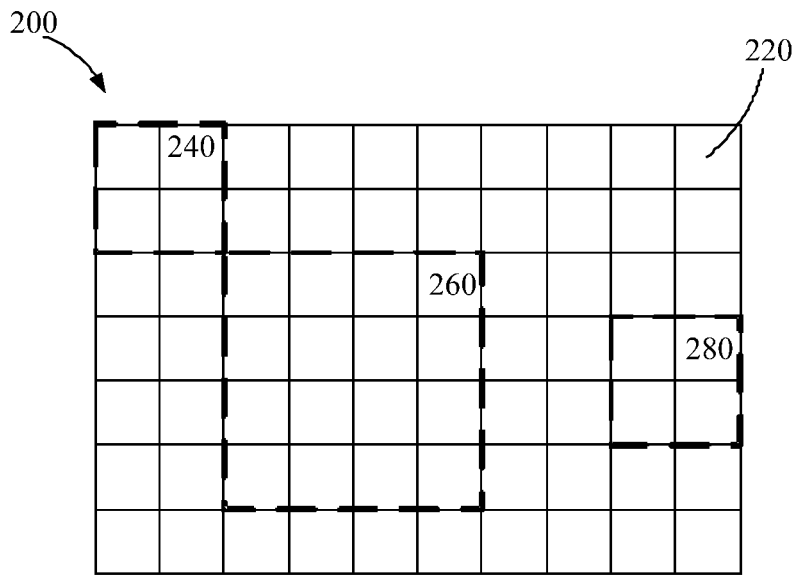
FIG. 2(a) to FIG. 2(f) are example schematic diagrams for changing the charge readout mode of an image sensor of a visible light signal receiving device according to the method of the embodiment of the present application.
Figure 2B:
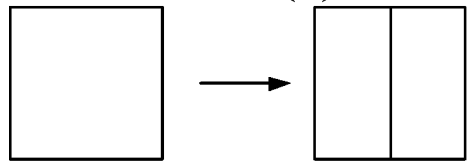
Figure 2C:
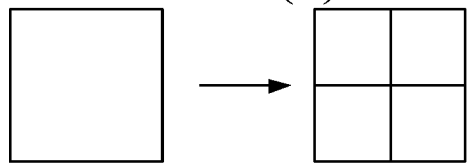
Figure 2D:
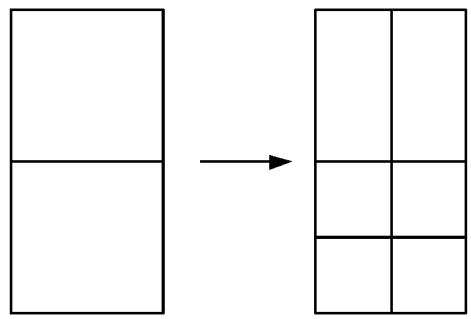

The visible light signal receiving device simultaneously receives visible light signals from a plurality of visible light signal transmit devices through an image sensor, which as shown in FIG. 2(a), is an exemplary image sensor 200. The image sensor 200 consists of a plurality of physical pixel units 220. As shown in FIG. 2(a), areas 240, 260, and 280 indicated by three dashed boxes are configured to receive visible light signals from three visible light signal transmit device, respectively. During communication, the communication performance may be influenced by the movement of any party or change in transmission environment. For example, increase of the communication distance between sending and receiving devices, interference between visible light signal transmit devices, or the like may cause the communication performance between the sending and receiving devices to be reduced.

S140: In response to a reduction in the communication performance between the visible light signal receiving device and the at least one visible light signal transmit device, take a first logic pixel unit of the image sensor related to the at least one visible light signal transmit device as at least two second logic pixel units to read separately, when reading inductive charges of an image sensor of the visible light signal receiving device.

In the method of the embodiments of the present application, in response to reduction in the communication performance between visible light sending and receiving devices, signal receiving channels are increased by changing the current charge readout mode of the image sensor of the visible light signal receiving device, that is, by changing the charge readout mode of at least one first logic pixel unit related to the visible light signal transmit device corresponding to the reduced communication performance (the at least one first logic pixel unit related comprises one or more first logic pixel units that receive light signals of the visible light signal transmit device corresponding to the reduced communication performance, for example, at least some of first logic pixel units of the image sensor of one or more first logic pixel units receiving light signals of the visible light signal transmit device corresponding to the reduced communication performance), so as to improve a multi-channel diversity gain and compensate the reduction in the communication performance to some extent. When the readout modes of a plurality of first logic pixel units are changed, the changed readout modes may be the same or different. Each of the first logic pixel units comprises at least two of the second logic pixel units. Each of the second logic pixel units comprises at least one physical pixel unit. For example, as shown in FIG. 2(a), a current charge readout mode of the image sensor is combining each four physical pixel units as one first logic pixel unit to be read. According to the method of the embodiments of the present application, if the communication performance between the visible light signal receiving device and one visible light signal transmit device is reduced and a first logic pixel unit related to the visible light signal transmit device is the first logic pixel unit in the area 240, the current charge readout mode of all the first logic pixel units or of only the first logic pixel unit in the area 240 of the image sensor may be changed. For example, as shown in FIG. 2(*b*), at a next time, the first logic pixel unit in the area 240 is taken as two second logic pixel units to be read separately, and each second logic pixel unit comprises two physical pixel units. Alternatively, as shown in FIG. 2(*c*), at a next time, the first logic pixel unit in the area 240 is taken as four second logic pixel units to be read separately, and each second logic pixel unit comprises one physical pixel unit. If the charge readout modes of two first logic pixel units are changed simultaneously, the changed charge readout modes of the two first logic pixel units may be the same or may also be different, as shown in FIG. 2(*d*).

To sum up, the method the embodiments of the present application is capable of compensating reduction in the communication performance to some extent by changing the charge readout mode of an image sensor of a visible light signal receiving device, and is more suitable for visible light communications in complicated mobile scenarios.

In the method of the embodiments of the present application, the communication performance between the visible light signal receiving device and the at least one visible light signal transmit device may be determined by various ways. For example, in a possible implementation, the communication performance may be acquired from other devices to which the communication performance between the visible light sending and receiving devices is known or which is able to determine the communication performance. Correspondingly, step S120 may comprise:

A first step of S120: Acquire the communication performance between the visible light signal receiving device and the at least one visible light signal transmit device.

In another possible implementation, the communication performance may also be determined according to the received visible light signal by the main body executing the method of the embodiments of the present application. Correspondingly, step S120 may comprise:

A second step of S120: Determine, at least according to a visible light signal received by each first logic pixel unit of the image sensor, the communication performance between the visible light signal receiving device and the at least one visible light signal transmit device.

For example, determining the received light signals are from the same visible light signal transmit device according to whether the strength of the received light signals is the same or not. Alternatively, determining the received light signals are from the same visible light signal transmit device according to whether the modulating signals capable of being obtained by demodulating the received light signals are the same or not. Correspondingly, the second step of S120 may further comprise:

A first sub-step of the second step of S120: Demodulate the visible light signal received by each first logic pixel unit of the image sensor.

A second sub-step of the second step of S120: For each of the first logic pixel units, in response to being able to obtain a modulating signal by the demodulating, determine a visible light signal from the at least one visible light signal transmit device and determine the communication performance between the visible light signal receiving device and the at least one visible light signal transmit device according to the determined visible light signal.

A third sub-step of the second step of S120: For each of the first logic pixel unit, in response to being not able to obtain a modulating signal by the demodulating, determine reduction in the communication performance between the visible light signal receiving device and the at least one visible light signal transmit device.

Taking that the charge readout mode of the image sensor is taking the first logic pixel unit as a unit to be read as an example, a modulating signal transmitted by the visible light signal transmit device may be obtained by the demodulating after each first logic pixel unit being readout and performing analog-to-digital conversion on the inductive charge readout from the each first logic pixel unit. The modulating signal is information sent from the visible light signal transmit device to the visible light signal receiving device by using visible light as a carrier signal. The visible light signal received by the visible light signal receiving device is a modulated signal that is modulated with the modulating signal. It should be noted that some of the charges sensed by the image sensor may be from ambient light. To demodulate the modulating signal better, influences of the ambient light should be removed first. For example, a suitable threshold is set during charge reading to filter out the influences of the ambient light. Alternatively, through distinguishing an area corresponding to the light signal from the visible light signal transmit device from an area corresponding to the ambient light signal based on the strength of the received light signals, and processing to the related area that only receives an ambient light signal is skipped. In the method of the embodiments of the present application, the pixel units from which a modulating signal is not able to obtained by the demodulating do not comprise the first logic pixel unit receiving ambient light only.

Generally, when mutual interferences do not exist between visible light signal transmit devices, that is, in a situation where all areas of the image sensor related to all the visible light signal transmit devices are separate and no overlap, as shown in FIG. 2(*a*), light signals received by all first logic pixel units related to the at least one visible light signal transmit device are demodulated. All first logic pixel units receiving signals from the same visible light signal transmit device can be found according to whether the signals obtained by the demodulating are the same or not, so as to determine a visible light signal from the at least one visible light signal transmit device. For example, as shown in FIG. 2(*a*), signals obtained by demodulating signals received by the four first logic pixel units in the area 260 should be the same. The corresponding communication performance can be determined according to the determined visible light signals of each visible light signal transmit device.

It should be noted that other suitable modes may also be used in addition to determining visible light signals from the same visible light signal transmit device by determining whether the strength of the received light signals is the same or not, or according to whether the signals obtained by the demodulating are the same or not.

When mutual interferences exist between the visible light signal transmit devices, that is, in a situation where there are overlaps between areas of the image sensor related to at least two visible light signal transmit devices, as shown in FIG. 2(*e*), the first logic pixel unit in the area 280 may simultaneously receive visible light signals from two visible light signal transmit devices. Because the first logic pixel unit is taken as one unit for charge reading currently, it is impossible to obtain a modulating signal by demodulating the signals received by the first logic pixel unit. In the method of the embodiments of the present application, in addition to first logic pixel units receiving ambient light signals, if there is a first logic pixel unit by which the signals incapable of being demodulated to obtain a modulating signal are received, it can be determined that the communication performance between the visible light signal receiving device and at least a certain visible light signal transmit device is reduced, and step S140 is further performed.

After the communication performance between the visible light signal receiving device and the at least one visible light signal transmit device is determined according to the received light signals, in step S140, the related at least one first logic pixel unit of which the charge readout mode is changed may be one or more first logic pixel units receiving a light signal from the visible light signal transmit device corresponding to the reduced communication performance, for example, at least some first logic pixel units of the image sensor comprising the one or more first logic pixel units that receive a light signal from the visible light signal transmit device corresponding to the reduced communication performance, and the related at least one first logic pixel unit may also be determined according to the light signal received by each first logic pixel unit. That is, step S140 may comprise:

A sub-step of S140: Determine a first logic pixel unit of the image sensor related to the at least one visible light signal transmit device at least according to the visible light signal received by each first logic pixel unit of the image sensor.

In combination with similar description in the second step of S120, a first logic pixel unit of image sensor related to the at least one visible light signal transmit device may be determined at least according to whether the strength of the received light signals is the same or not or according to whether the modulating signals obtained by demodulating the light signals received are the same. However, the present application is not limited thereto. Taking a modulating signal obtained by the demodulating as an example, the sub-step of S140 may further comprise:

A first sub-sub-step of S140: Determine the first logic pixel unit of the image sensor related to the at least one visible light signal transmit device according to the visible light signal determined in the second sub-step of the second step of S120.

Figure 2E:
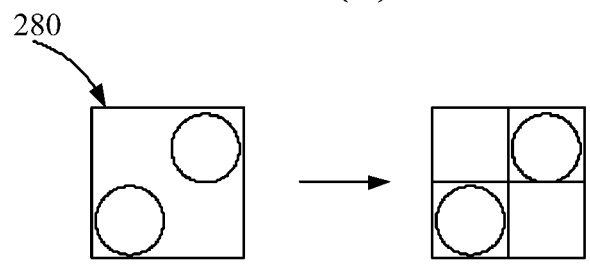

A second sub-sub-step of S140: Determine that at least one first logic pixel unit by which the signal incapable of being demodulated to obtain the modulating signal is received is the first logic pixel unit of the image sensor related to the at least one visible light signal transmit device. Still taking FIG. 2(a) as an example, assuming that it is impossible to obtain a modulating signal by demodulating signals received by the first logic pixel unit in the area 280, it can be determined that the at least one first logic pixel unit of the image sensor is the first logic pixel unit in the area 280. During charge reading at a next time, taking the first logic pixel unit in the area 280 as at least two second logic pixel units to be read separately or, taking each first logic pixel unit of the image sensor as two second logic pixel units to be read separately, so as to reduce interference and improve communication quality. As shown in FIG. 2(e), the first logic pixel unit in the area 280 is taken as four second logic pixel units (each of which comprises one physical pixel unit) to be read separately, so as to distinguish pixel units related to two visible light signal receiving devices.

In addition, in the method of the embodiments of the present application, the communication performance can be determined by using a plurality of possible evaluation indicators. The second sub-step of the second step of S120 may also further comprise:

A first sub-sub-step: Determine at least one evaluation indicator of the communication performance at least according to the determined visible light signal.

A second sub-sub-step: Determine the communication performance between the visible light signal receiving device and the at least one visible light signal transmit device at least according to the evaluation indicator.

Figure 2F:
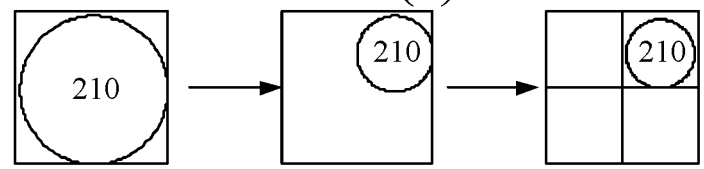

In one possible implementation, the evaluation indicator comprises: the size of a light spot projected by the at least one visible light signal transmit device on the image sensor. The size of the light spot is related to the distance and the angle between the visible light signal transmit device and the visible light signal receiving device and may reflect a level of the communication performance to some extent. In the implementation, the size of the corresponding light spot may be determined according to the determined visible light signal from the visible light signal transmit device in the first sub-sub-step. For example, the total area of areas corresponding to all first logic pixel units related to a determined visible light signal of one visible light signal transmit device is the size of the light spot projected by the visible light signal transmit device on the image sensor. In the second sub-sub-step, the reduction in the communication performance can be determined in response to that the size of the light spot decreases, or the reduction amount of the size of the light spot exceeds a first threshold, or the size of the light spot is less than a second threshold. The first threshold and the second threshold both can be determined according to the communication demand and/or historical communication information. For example, the first threshold is set to such a value that the communication between visible light sending and receiving devices may be influenced if the reduction amount of the size of the light spot exceeds the first threshold. The second threshold is set to such a value that a normal communication between visible light sending and receiving devices may be influenced if the size of the light spot decreases to be less than the second threshold. For example, as shown in FIG. 2(f), the size of a light spot 210 at a previous time is corresponding to one first logic pixel unit, in response to that the size of the light spot 210 decreases at a current time, or the reduction amount of the size of the light spot 210 exceeds the first threshold (for example, exceeds one second logic pixel unit), or the size of the light spot 210 is smaller than one physical pixel unit, reduction in the communication performance between the visible light signal receiving device and the visible light signal transmit device corresponding to the light spot 210 is determined. Further, through step S140, the first logic pixel unit related to the light spot 210 may be taken as four second logic pixel units (each of which comprises one physical pixel unit) to be read separately when reading inductive charges of the image sensor of the visible light signal receiving device.

In another possible implementation, the evaluation indicator may comprise: the signal-to-noise ratio of the visible light signal transmitted by the at least one visible light signal transmit device and received by the visible light signal receiving device. The value of the signal-to-noise ratio may reflect the level of the communication performance to some extent. To determine a signal-to-noise ratio according to a received signal is a mature existing technology in the art. In this implementation, in the second sub-sub-step, the reduction in the communication performance may be determined in response to that the signal-to-noise ratio is reduced, or the reduction amount of the signal-to-noise ratio exceeds a third threshold, or the signal-to-noise ratio is less than a fourth threshold. For example, the third threshold is set to such a value that communications between visible light sending and receiving devices may be influenced if the reduction amount of the signal-to-noise ratio exceeds the third threshold. The fourth threshold is set to such a value that normal communications between visible light sending and receiving devices may be influenced if the signal-to-noise ratio decreases to be less than the fourth threshold. The third threshold and the fourth threshold both can be determined according to the communication demand and/or historical communication information. Through step S140, the related first logic pixel unit may be divided into at least two second logic pixel units to be read separately when reading charges, which can reduce noise receipt during the communication and improve the signal-to-noise ratio of the received signal.

In another possible implementation, the evaluation indicator may comprise: the bit error ratio of the visible light signal transmitted by the at least one visible light signal transmit device and received by the visible light signal receiving device. The value of the bit error ratio may reflect the level of the communication performance to some extent. To determine a bit error ratio according to a received signal is a mature existing technology in the art. In this implementation, in the second sub-sub-step, the reduction in the communication performance may be determined in response to that the bit error ratio increases, or an increment of the bit error ratio exceeds a fifth threshold, or the bit error ratio exceeds a sixth threshold. The fifth threshold and the sixth threshold both can be determined according to the communication demand and/or historical communication information. For example, the fifth threshold is set to such a value that the communications between visible light sending and receiving devices may be influenced if the increment of the bit error ratio exceeds the fifth threshold. The sixth threshold is set to such a value that normal communications between visible light sending and receiving devices may be influenced if the bit error ratio increases to exceed the sixth threshold. Through step S140, the related first logic pixel unit may be divided into at least two second logic pixel units to be read separately when reading charges, which can reduce noise receipt during the communication and reduce the bit error ratio of the received signal.

In a further possible implementation, the communication performance may not be determined directly by using a received signal, and the communication performance between sending and receiving devices is determined directly according to a change in the distance between the sending and receiving devices. The value of the distance between the sending and receiving devices may reflect the level of the communication performance to some extent. For example, increase of the distance may cause reduction in the communication performance. In this implementation, step S120 may further comprise:

The second step of S120: Determine the distance between the visible light receiving device and the at least one visible light signal transmit device. For example, the position of a visible light signal transmit device may be determined in a method such as GPS positioning, to further determine the distance between the visible light signal transmit device and the visible light signal receiving device, or the distance may be acquired through direct communications with the visible light signal transmit device.

The third step of S120: Determine the reduction in the communication performance in response to that the distance increases, or the increment of the distance exceeds a seventh threshold, or the distance exceeds an eighth threshold. The seventh threshold and the eighth threshold both can be determined according to the communication demand and/or historical communication information. For example, the seventh threshold is set to such a value that the communication between visible light sending and receiving devices may be influenced if the increment of the distance exceeds the seventh threshold. The eighth threshold is set to such a value that normal communication between visible light sending and receiving devices may be influenced if the distance increases to exceed the eighth threshold.

In such the implementation, the at least one related first logic pixel unit of the image sensor may still be determined according to the description in the sub-step of S140, or controlling to take each of all first logic pixels of the image sensor as at least two second logic pixel units to be read directly when reading charges.

It should be noted that the communication performance may be determined by comprehensively considering all the aforementioned evaluation indicators in the method of the embodiments of the present application. For example, the increase in the communication distance may not cause the reduction in the communication performance, and for example, the signal-to-noise ratio of the received signal may be considered comprehensively. In addition to the aforementioned evaluation indicators, other indicators for evaluating the communication quality may further be considered in the method of the embodiments of the present application, for example, a channel estimation value, a system throughput, and any other indicators that can be easily conceived by a person of ordinary skill in the art.

In view of the above, the method of the embodiments of the present application can be simply controlled and can improve the communication quality of visible light communications.

It should be understood that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, the embodiments of the present application further provide a computer readable medium, which comprises computer readable instructions that perform the following operations upon execution: operations of all steps in the method of the implementation manner shown in FIG. 1.

Figure 3A:
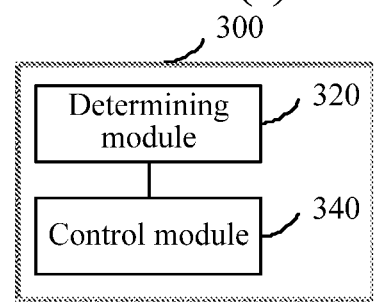
FIG. 3(a) to FIG. 3(h) are example block diagrams of a plurality of implementation of a visible light signal receiving and control apparatus of the embodiment of the present application.
Figure 3B:
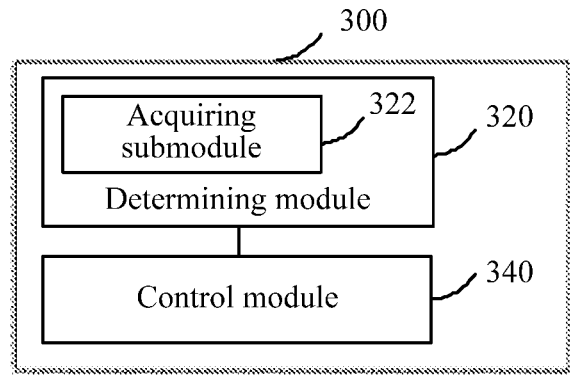
Figure 3C:
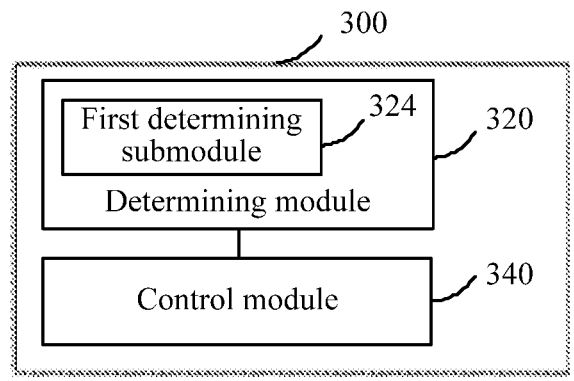
Figure 3D:
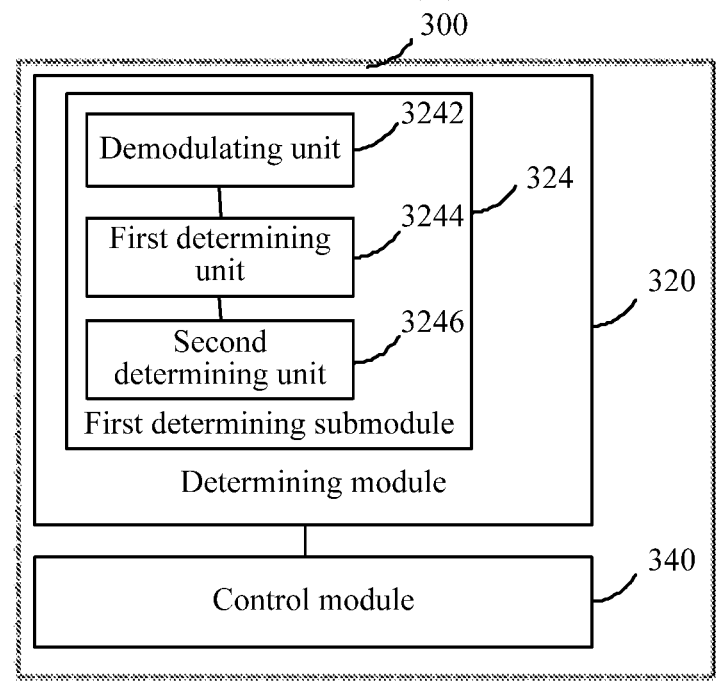
Figure 3E:
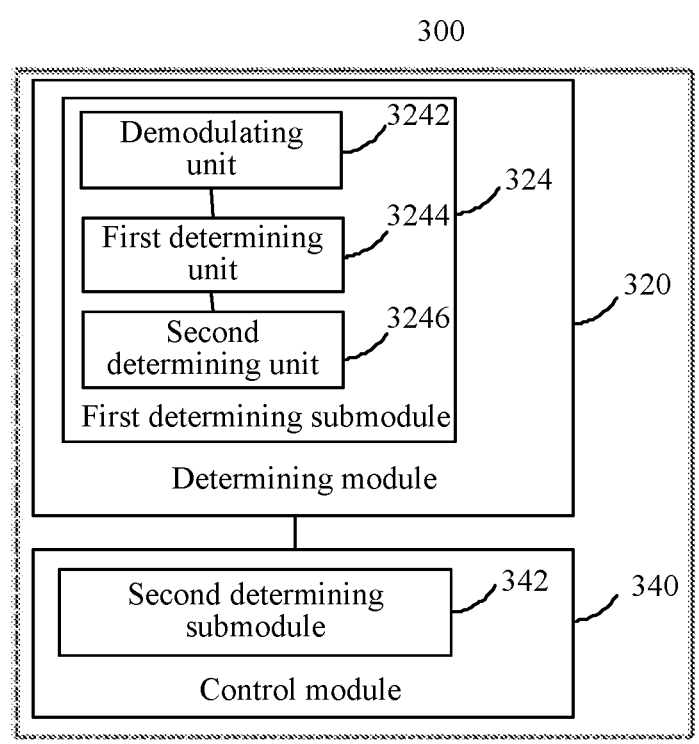
Figure 3F:
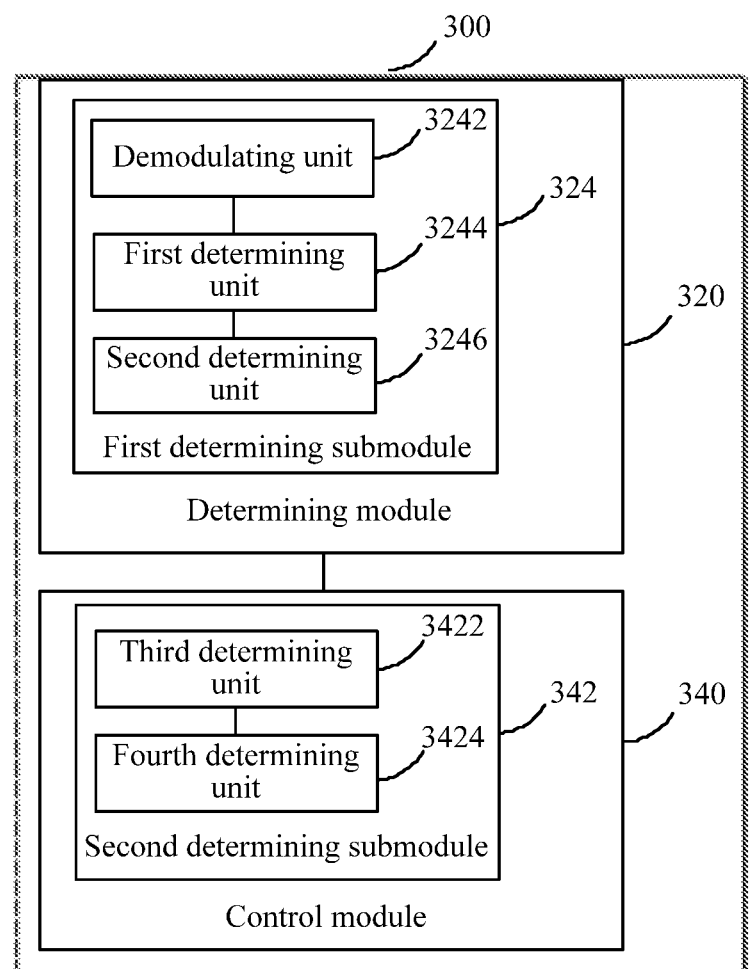
Figure 3G:
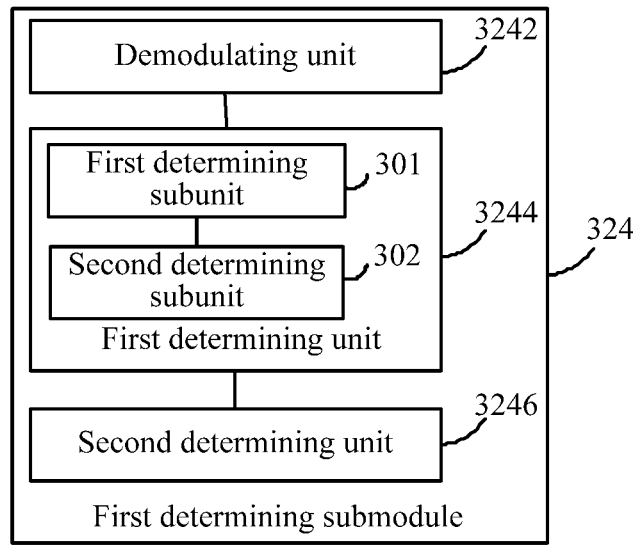

The embodiments of the present application further provide a visible light signal receiving and control apparatus for executing the aforementioned visible light signal receiving and control method. The apparatus may be an apparatus independent from the visible light signal receiving device, or may belong to the visible light signal receiving device. Alternatively, the apparatus is the visible light signal receiving device. When the apparatus is the visible light signal receiving device, in addition to all the components to be described below, the apparatus may also further comprise other necessary components for performing visible light communications. In addition, according to the needs of the aforementioned different execution roles, in addition to all the components described below, the apparatus further comprises a communication module that can implement communications with any device outside the apparatus as necessary. In addition to all the components to be described below, the device may further comprise other necessary components of the visible light signal transmit device. Also, in addition to all the components described below, the device may further comprise a communication module that can implement communications with any device outside the apparatus (apart from the visible light signal transmit device) as necessary. As shown in FIG. 3(a), a visible light signal receiving and control apparatus 300 of the embodiments of the present application comprises a determining module 320 and a control module 340.

The determining module 320 is configured to determine communication performance between a visible light signal receiving device and at least one visible light signal transmit device.

The visible light signal receiving device simultaneously receives visible light signals from a plurality of visible light signal transmit devices through an image sensor, which as shown in FIG. 2(*a*), is an exemplary image sensor 200. The image sensor 200 consists of a plurality of physical pixel units 220. As shown in FIG. 2(*a*), areas 240, 260, and 280 indicated by three dashed boxes are configured to receive visible light signals from three visible light signal transmit device, respectively. During communication, the communication performance may be influenced by the movement of any party or change in transmission environment. For example, increase of the communication distance between sending and receiving devices, interference between visible light signal transmit devices, or the like may cause the communication performance between the sending and receiving devices to be reduced.

The control module 340 is configured to, in response to reduction in the communication performance between the visible light signal receiving device and the at least one visible light signal transmit device, take one first logic pixel unit of an image sensor related to the at least one visible light signal transmit device as at least two second logic pixel units to be read separately when reading inductive charges of the image sensor of the visible light signal receiving device.

In the apparatus of the embodiments of the present application, in response to reduction in the communication performance between visible light sending and receiving devices, the control module 340 increases signal receiving channels by changing the current charge readout mode of the image sensor of the visible light signal receiving device, that is, by changing the charge readout mode of at least one first logic pixel unit related to the visible light signal transmit device corresponding to the reduced communication performance (the at least one first logic pixel unit related comprises one or more first logic pixel units receiving light signals of the visible light signal transmit device corresponding to the reduced communication performance, for example, at least some of first logic pixel units of the image sensor of one or more first logic pixel units of light signals of the visible light signal transmit device corresponding to the reduced communication performance), so as to improve a multi-channel diversity gain and compensate the reduction in the communication performance to some extent. When the readout modes of a plurality of first logic pixel units are changed, the changed readout modes may be the same or different. Each of the first logic pixel units comprises at least two of the second logic pixel units. Each of the second logic pixel units comprises at least one physical pixel unit of the image sensor. For example, as shown in FIG. 2(*a*), a current charge readout mode of the image sensor is combining each four physical pixel units as one first logic pixel unit to be read. According to the method of the embodiments of the present application, if the communication performance between the visible light signal receiving device and one visible light signal transmit device is reduced and a first logic pixel unit that is related to the visible light signal transmit device is the first logic pixel unit in the area 240, the current charge readout mode of all the first logic pixel units or of only the first logic pixel unit in the area 240 of the image sensor may be changed. For example, as shown in FIG. 2(*b*), at a next time, the first logic pixel unit in the area 240 is taken as two second logic pixel units to be read separately, and each second logic pixel unit comprises two physical pixel units. Or, as shown in FIG. 2(*c*), at a next time, the first logic pixel unit in the area 240 is taken as four second logic pixel units to be read separately, and each second logic pixel unit comprises one physical pixel unit. If the charge readout mode of two first logic pixel units are changed simultaneously, the changed charge readout modes of the two first logic pixel units may be the same or may also be different, as shown in FIG. 2(*d*).

To sum up, the apparatus of the embodiments of the present application is capable of compensating reduction in the communication performance to some extent by changing the charge readout mode of an image sensor of a visible light signal receiving device, and is more suitable for visible light communications in complicated mobile scenarios.

In the apparatus of the embodiments of the present application, the determining module 320 may determine the communication performance between the visible light signal receiving device and the at least one visible light signal transmit device by various ways. For example, in a possible implementation, the communication performance may be acquired from other devices to which the communication performance between the visible light sending and receiving devices is known or which is able to determine the communication performance. Correspondingly, as shown in FIG. 3(*b*), the determining module 320 may comprise: an acquiring submodule 322.

The acquiring submodule 322 is configured to acquire the communication performance between the visible light signal receiving device and the at least one visible light signal transmit device.

In another possible implementation, the communication performance may also be determined according to the received visible light signal by the apparatus of the present application. Correspondingly, as shown in FIG. 3(*c*), the determining module 320 may comprise a first determining submodule 324.

The first determining submodule 324 is configured to determine, at least according to a visible light signal received by each first logic pixel unit of the image sensor, the communication performance between the visible light signal receiving device and the at least one visible light signal transmit device.

For example, determining the received light signals are from the same visible light signal transmit device according to whether the strength of the received light signals is the same or not. Alternatively, determining the received light signals are from the same visible light signal transmit device according to whether modulating signals capable of being demodulated from the received light signals are the same or not. Taking a modulating signal obtained by the demodulating as an example, as shown in FIG. 3(*d*), the first determining submodule 324 may further comprise: a demodulating unit 3242, a first determining unit 3244, and a second determining unit 3246.

The demodulating unit 3242 is configured to demodulate the visible light signal received by each first logic pixel unit of the image sensor. The demodulating unit 3242 may be one part of the visible light receiving device.

The first determining unit 3244 is configured to: for each of the first logic pixel units, in response to being able to obtain a modulating signal by the demodulating, determine a visible light signal from the at least one visible light signal transmit device and determine the communication performance between the visible light signal receiving device and the at least one visible light signal transmit device at least according to the determined visible light signal.

The second determining unit 3246 is configured to: for each of the first logic pixel unit, in response to being not able to obtain a modulating signal by the demodulating, determine reduction in the communication performance between the visible light signal receiving device and the at least one visible light signal transmit device.

According to the apparatus of the embodiments of the present application, the determining module 320 needs to determine the communication performance between the current sending and receiving devices according to the received signal. Taking that the charge readout mode of the image sensor is taking the first logic pixel unit as a unit to be read as an example. A modulating signal transmitted by the visible light signal transmit device may be obtained by the demodulating after each first logic pixel unit being read and performing analog-to-digital conversion on the inductive charge readout from the each first logic pixel unit. The modulating signal is information sent from a visible light signal transmit device to the visible light signal receiving device by using visible light as a carrier signal. The visible light signal received by the visible light signal receiving device is a modulated signal that is modulated with the modulating signal. It should be noted that some of the charges sensed by the image sensor may be from ambient light. To demodulate the modulating signal better, influences of the ambient light should be removed first. For example, a suitable threshold is set during charge reading to filter out the influences of the ambient light. Alternatively, through distinguishing an area corresponding to the light signal from the visible light signal transmit device from that of an area corresponding to the ambient light signal based on the strength of the received light signals, and it's possible to ignore the related area receiving an ambient light signal only without processing it. In the apparatus of the embodiments of the present application, the pixel units from which a modulating signal is not able to obtained by the demodulating do not comprise the first logic pixel unit receiving ambient light only.

Generally, when mutual interferences do not exist between visible light signal transmit devices, that is, in a situation where all areas of the image sensor related to all the visible light signal transmit devices are separate and no overlap, as shown in FIG. 2(*a*), light signals received by all first logic pixel units related to the at least one visible light signal transmit device are demodulated. All first logic pixel units receiving signals from the same visible light signal transmit device can be found according to whether signals obtained by the demodulating are the same or not, so as to determine a visible light signal from the at least one visible light signal transmit device. For example, as shown in FIG. 2(*a*), signals obtained by demodulating signals received by the four first logic pixel units in the area 280 should be the same. The corresponding communication performance can be determined according to the determined visible light signal of each visible light signal transmit device.

It should be noted that other suitable modes may also be used in addition to determining visible light signals from the same visible light signal transmit device by determining whether the strength of the received light signals is the same or according to whether the signals obtained by the demodulating are the same or not.

After determining the communication performance between the visible light signal receiving device and the at least one visible light signal transmit device according to the received light signals, the related at least one first logic pixel unit of which the charge readout mode is changed by the control module 340 may be one or more first logic pixel units receiving a light signal from the visible light signal transmit device corresponding to the reduced communication performance, for example, at least some first logic pixel units of the image sensor comprising the one or more first logic pixel units that receive a light signal from the visible light signal transmit device corresponding to the reduced communication performance, and the related at least one first logic pixel unit may also be determined according to the light signal received by each first logic pixel unit. That is, as shown in FIG. 3(*e*), the control module 340 may comprise a second determining submodule 342.

The second determining submodule 342 is configured to determine a first logic pixel unit of the image sensor related to the at least one visible light signal transmit device at least according to the visible light signal received by each first logic pixel unit of the image sensor.

In combination with similar description for the first determining submodule 324, a first logic pixel unit of image sensor related to the at least one visible light signal transmit device may be determined at least according to whether the strength of the received light signals is the same or according to whether modulating signals obtained by demodulating the light signals received are the same. However, the present application is not limited thereto. Taking a modulating signal obtained by the demodulating as an example, as shown in FIG. 3(*f*), the second determining submodule 342 may further comprise: a third determining unit 3422 and a fourth determining unit 3424.

The third determining unit 3422 is configure to determine the first logic pixel unit of the image sensor related to the at least one visible light signal transmit device at least according to the visible light signal determined by the first determining unit 3244.

The fourth determining unit 3424 is configured to determine that at least one first logic pixel unit by which the signal incapable of being demodulated to obtain the modulating signal is received is the first logic pixel unit of the image sensor related to the at least one visible light signal transmit device. Still taking FIG. 2(*a*) is as an example. Assuming that it is impossible to obtain a modulating signal by demodulating signals received by the first logic pixel unit in the area 280, it can be determined that the at least one first logic pixel unit of the image sensor is the first logic pixel unit in the area 280. During charge reading at a next time, taking the first logic pixel unit in the area 280 as at least two second logic pixel units (each of which comprises one physical pixel unit) to be read separately or taking each first logic pixel unit of the image sensor as two second logic pixel units to be read separately, so as to reduce interference and improve communication quality. As shown in FIG. 2(*e*), the first logic pixel unit in the area 280 is taken as four second logic pixel units to be read separately, so as to distinguish pixel units related to two visible light signal receiving devices.

In addition, in the apparatus of the embodiments of the present application, the communication performance may be determined by using a plurality of possible evaluation indicators. As shown in FIG. 3(*g*), the first determining unit 3244 may further comprise: a first determining subunit 301 and a second determining subunit 302.

The first determining subunit 301 is configured to determine at least one evaluation indicator of the communication performance at least according to the visible light signal.

The second determining subunit 302 is configured to determine the communication performance between the visible light signal receiving device and the at least one visible light signal transmit device at least according to the evaluation indicator.

In one possible implementation, the evaluation indicator comprises: the size of a light spot projected by the at least one visible light signal transmit device on the image sensor. The size of the light spot is related to the distance and the angle between the visible light signal transmit device and the visible light signal receiving device and may reflect a level of the communication performance to some extent. In the implementation, the first determining subunit 301 may determine the size of the corresponding light spot according to the determined visible light signal of the visible light signal transmit device. For example, the total area of areas corresponding to all first logic pixel units related to a determined visible light signal of one visible light signal transmit device is the size of the light spot projected by the visible light signal transmit device on the image sensor. The second determining subunit 302 may determine reduction in the communication performance in response to that the size of the light spot decreases, or the reduction amount of the size of the light spot exceeds a first threshold, or the size of the light spot is less than a second threshold. The first threshold and the second threshold both can be determined according to the communication demand and/or historical communication information. For example, the first threshold is set to such a value that the communication between visible light sending and receiving devices may be influenced if the reduction of the size of the light spot exceeds the first threshold. The second threshold is set to such a value that a normal communication between visible light sending and receiving devices may be influenced if the size of the light spot decreases to be less than the second threshold. For example, as shown in FIG. 2(f), the size of a light spot 210 at a previous time is corresponding to one first logic pixel unit, in response to that the size of the light spot 210 decreases at a current time, or the reduction amount of the size of the light spot 210 exceeds the first threshold (for example, exceeds one second logic pixel unit), or the size of the light spot 210 is smaller than one physical pixel unit, reduction in the communication performance between the visible light signal receiving device and the visible light signal transmit device corresponding to the light spot 210 is determined. Further, by using the control module 340, the first logic pixel unit related to the light spot 210 may be taken as four second logic pixel units (each of which comprises one physical pixel unit) to be read separately when reading inductive charges of the image sensor of the visible light signal receiving device.

In another possible implementation, the evaluation indicator may comprise: the signal-to-noise ratio of the visible light signal transmitted by the at least one visible light signal transmit device and received by the visible light signal receiving device. The value of the signal-to-noise ratio may reflect the level of the communication performance to some extent. To determine a signal-to-noise ratio according to a received signal is a mature existing technology in the art. In such the implementation, the second determining subunit 302 may determine reduction in the communication performance in response to that the signal-to-noise ratio is reduced, the reduction amount of the signal-to-noise ratio exceeds a third threshold, or the signal-to-noise ratio is less than a fourth threshold. The third threshold and the fourth threshold both can be determined according to a communication need and/or historical communication information. For example, the third threshold is set to such a value that communications between visible light sending and receiving devices may be influenced if the reduction of the signal-to-noise ratio exceeds the third threshold. The fourth threshold is set to such a value that normal communications between visible light sending and receiving devices may be influenced if the signal-to-noise ratio decreases to be less than the fourth threshold. By using the control module 340, the related first logic pixel unit may be divided into at least two second logic pixel units to be read separately when reading charges, which can reduce noise receipt in the communication process and improve the signal-to-noise ratio of the received signal.

In another possible implementation, the evaluation indicator may comprise: the bit error ratio of the visible light signal transmitted by the at least one visible light signal transmit device and received by the visible light signal receiving device. The value of the bit error ratio may reflect the level of the communication performance to some extent. To determine a bit error ratio according to a received signal is a mature existing technology in the art. In such the implementation the second determining subunit 302 may determine the reduction in the communication performance in response to that the bit error ratio increases, or an increment of the bit error ratio exceeds a fifth threshold, or the bit error ratio exceeds a sixth threshold. The fifth threshold and the sixth threshold both can be determined according to the communication demand and/or historical communication information. For example, the fifth threshold is set to such a value that communications between visible light sending and receiving devices may influenced if the increment of the bit error ratio exceeds the fifth threshold. The sixth threshold is set to such a value that normal communications between visible light sending and receiving devices may be influenced if the bit error ratio increases to exceed the sixth threshold. By using the control module 340, the related first logic pixel unit may be divided into at least two second logic pixel units to be read separately when reading charges, which can reduce noise receipt in the communication process and reduce the bit error ratio of the received signal.

Figure 3H:
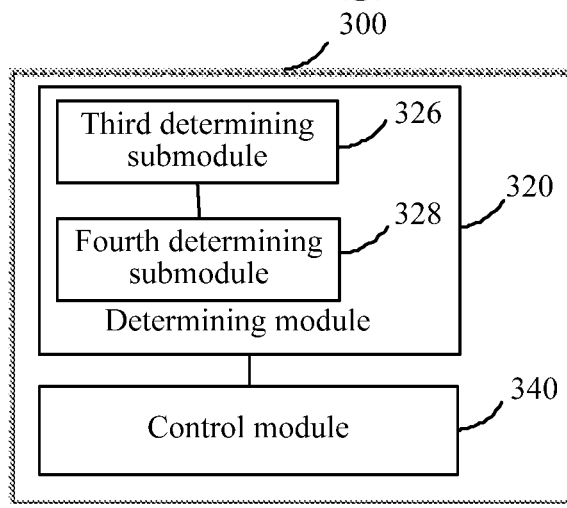

In a further possible implementation, the determining module 320 may not determine the communication performance directly by using a received signal, but determine the communication performance between sending and receiving devices directly according to a change in the distance between the sending and receiving devices. The value of the distance between the sending and receiving devices may reflect the level of the communication performance to some extent. For example, increase of the distance may cause reduction in the communication performance. In such the implementation, as shown in FIG. 3(h), the determining module 320 may further comprise a third determining submodule 326 and a fourth determining submodule 328.

The third determining submodule 326 is configured to determine the distance between the visible light receiving device and the at least one visible light signal transmit device. For example, the position of a visible light signal transmit device may be determined in a method such as GPS positioning, to further determine the distance between the visible light signal transmit device and the visible light signal receiving device, or the distance may be acquired through direct communications with the visible light signal transmit device.

The fourth determining submodule 328 is configured to determine reduction in the communication performance in response to that the distance increases, or the increment of the distance exceeds a seventh threshold, or the distance exceeds an eighth threshold. The seventh threshold and the eighth threshold both can be determined according to the communication demand and/or historical communication information. For example, the seventh threshold is set to such a value that communications between visible light sending and receiving devices may be influenced if the increment of the distance exceeds the seventh threshold. The eighth threshold is set to such a value that normal communications between visible light sending and receiving devices may be influenced if the distance increases to exceed the eighth threshold.

In such the implementation, the control module 340 may still determine the at least one first logic pixel unit of the image sensor in combination with the description for the second determining submodule 342, or may directly control to take each of first logic pixels as at least two second logic pixel units to be read when reading charges.

It should be noted that the communication performance may be determined by comprehensively considering all the aforementioned evaluation indicators in the apparatus of the embodiments of the present application. For example, the increase in the communication distance may not cause the reduction in the communication performance, and for example, the signal-to-noise ratio of the received signal may be considered comprehensively. In addition to the aforementioned evaluation indicators, other indicators for evaluating the communication quality may further be considered in the apparatus of the embodiments of the present application, for example, a channel estimation value, a system throughput, and any other indicator that can be easily conceived of by a person of ordinary skill in the art.

In view of the above, the apparatus of the embodiments of the present application can be simply controlled and can improve the communication quality of visible light communications.

Figure 4:
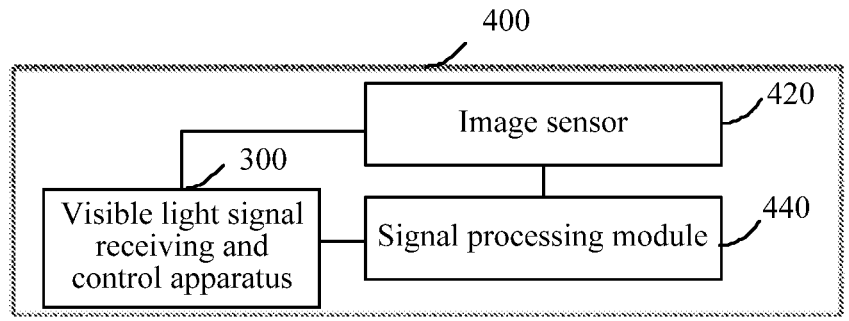
FIG. 4 is an example block diagram of a visible light signal receiving device of the embodiments of the present application.

As shown in FIG. 4, the embodiments of the present application further provide a visible light signal receiving device 400. The device 400 comprises the visible light signal receiving and control apparatuses 300, as shown in FIG. 3(*a*) to FIG. 3(*h*), and in addition, further comprises an image sensor 420, a signal processing module 440, or the like. The signal processing module 440 is configured to read an inductive charge of the image sensor 420 and perform analog-to-digital conversion, demodulation, or the like on the inductive charge under the control of the apparatus 300.

Figure 5:
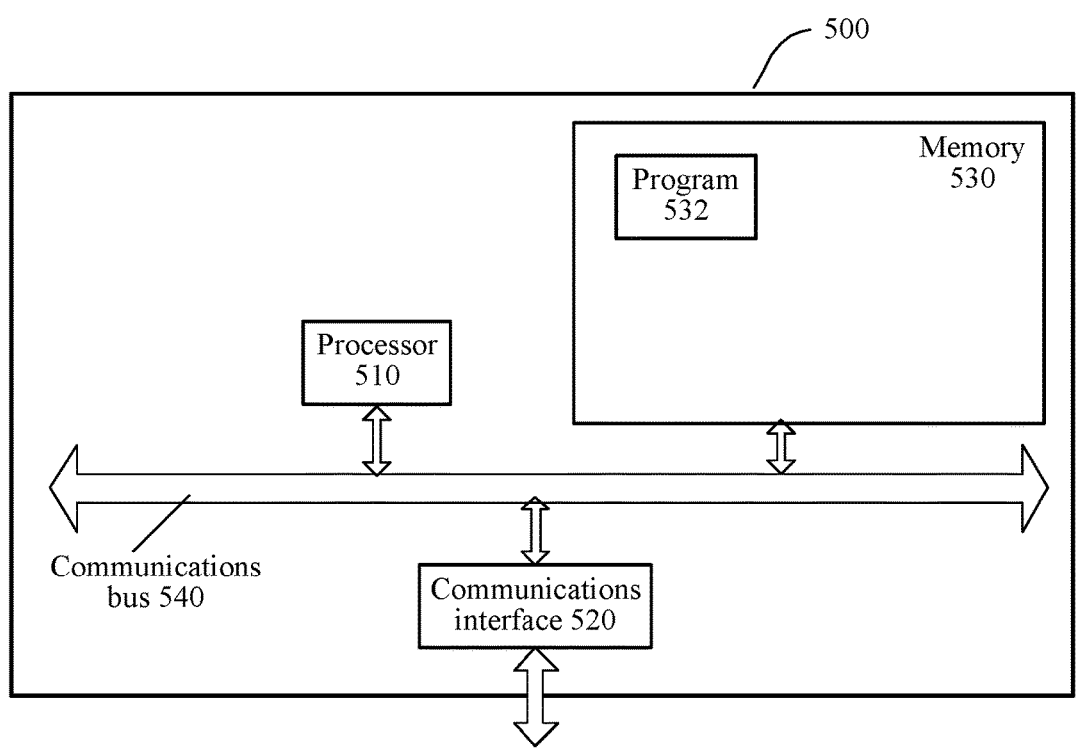
FIG. 5 is an example structural block diagram of a visible light signal receiving and control apparatus of another embodiment of the present application.

FIG. 5 is a schematic structural diagram of a visible light signal receiving and control apparatus 500 provided by the embodiments of the present application. The specific embodiments of the present application do not specifically limit the visible light signal receiving and control apparatus 500. As shown in FIG. 5, the visible light signal receiving and control apparatus 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532 and may specifically implement related functions of the visible light signal receiving and control apparatus in the apparatus embodiment in FIG. 3(*a*).

Specifically, the program 532 may comprise a program code, where the program code comprises a computer operation instruction.

The processor 510 may be a central processing unit (CPU), an application specific integrated circuit (ASIC), or one or more integrated circuits configured to implement the embodiments of the present application. The program 532 may specifically execute the following steps by using the visible light signal receiving and control apparatus 500:

determining a communication performance between a visible light signal receiving device and at least one visible light signal transmit device; and in response to a reduction in the communication performance between the visible light signal receiving device and the at least one visible light signal transmit device, take a first logic pixel unit of the image sensor related to the at least one visible light signal transmit device as at least two second logic pixel units to read separately, when reading an inductive charge of an image sensor of the visible light signal receiving device.

Each of the first logic pixel units comprises the at least two of the second logic pixel units. Each of the at least two second logic pixel units comprises at least one physical pixel unit of the image sensor.

For the specific implementation of the steps in the program 532, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the corresponding description in the foregoing apparatus embodiments for detailed working procedures of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium may specifically comprise, but is not limited to, a U flash drive, a removable hard disk, a read-only memory (ROM), a random access memory (RAM), an erasable programmable read only memory (EPROM), an electrically erasable and programmable read-only memory (EEPROM), a flash memory or other solid-state memory device, a CD-ROM, a digital versatile disc (DVD), an HD-DVD, Blue-Ray or other optical storage devices, a magnetic tape, disk storage or other magnetic storage devices, or any other medium that can store needed information and may be accessed by computers.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A visible light signal receiving and control method, wherein the method comprises:
    determining a communication performance between a visible light signal receiving device and at least one visible light signal transmit device; and
    in response to a reduction in the communication performance between the visible light signal receiving device and the at least one visible light signal transmit device, taking a first logic pixel unit of an image sensor related to the at least one visible light signal transmit device as at least two second logic pixel units to read separately, when reading an inductive charge of the image sensor of the visible light signal receiving device, each of the first logic pixel units comprising the at least two second logic pixel units, and each of the at least two second logic pixel units comprising at least one physical pixel unit of the image sensor.

2. The method of claim 1, wherein determining the communication performance between the visible light signal receiving device and the at least one visible light signal transmit device comprises:
    determining, at least according to a visible light signal received by each first logic pixel unit of the image sensor, the communication performance between the visible light signal receiving device and the at least one visible light signal transmit device.

3. The method of claim 1, wherein determining a communication performance between a visible light signal receiving device and at least one visible light signal transmit device comprises:
    determining the distance between the visible light receiving device and the at least one visible light signal transmit device; and
    determining the reduction in the communication performance in response to that the distance increases, or an increment of the distance exceeds a seventh threshold, or the distance exceeds an eighth threshold.

4. The method of claim 1, wherein determining a communication performance between a visible light signal receiving device and at least one visible light signal transmit device comprises:
    acquiring the communication performance between the visible light signal receiving device and the at least one visible light signal transmit device.

5. The method of claim 2, wherein determining, at least according to a visible light signal received by each first logic pixel unit of the image sensor, the communication performance between the visible light signal receiving device and the at least one visible light signal transmit device comprises:
    demodulating a visible light signal received by each first logic pixel unit of the image sensor;
    for each of the first logic pixel units, in response to being able to obtain a modulating signal by the demodulating, determining a visible light signal from the at least one visible light signal transmit device and determining the communication performance between the visible light signal receiving device and the at least one visible light signal transmit device at least according to the determined visible light signal; and
    for each of the first logic pixel unit, in response being not able to obtain a modulating signal by the demodulating, determining reduction of the communication performance between the visible light signal receiving device and the at least one visible light signal transmit device.

6. The method of claim 5, wherein determining the communication performance between the visible light signal receiving device and the at least one visible light signal transmit device at least according to the determined visible light signal comprises:
    determining at least one evaluation indicator of the communication performance at least according to the determined visible light signal; and
    determining the communication performance between the visible light signal receiving device and the at least one visible light signal transmit device at least according to the evaluation indicator.

7. The method of claim 5, wherein taking a first logic pixel unit of an image sensor related to the at least one visible light signal transmit device as at least two second logic pixel units to read separately comprises:
    determining a first logic pixel unit of the image sensor related to the at least one visible light signal transmit device at least according to the visible light signal received by each first logic pixel unit of the image sensor.

8. The method of claim 6, wherein the evaluation indicator comprises: the size of a light spot projected by the at least one visible light signal transmit device on the image sensor; and
    determining the communication performance between the visible light signal receiving device and the at least one visible light signal transmit device at least according to the evaluation indicator comprises:
  determining the reduction in the communication performance in response to that the size of the light spot decreases, or the reduction amount of the size of the light spot exceeds a first threshold, or the size of the light spot is smaller than a second threshold.

9. The method of claim 6, wherein the evaluation indicator comprises: the signal-to-noise ratio of the visible light signal received by the visible light signal receiving device from the at least one visible light signal transmit device; and
  determining the communication performance between the visible light signal receiving device and the at least one visible light signal transmit device at least according to the evaluation indicator comprises:
  determining the reduction in the communication performance in response to that the signal-to-noise ratio decreases, the reduction amount of the signal-to-noise ratio exceeds a third threshold, or the signal-to-noise ratio is less than a fourth threshold.

10. The method of claim 6, wherein the evaluation indicator comprises: a bit error ratio of the visible light signal received by the visible light signal receiving device from the at least one visible light signal transmit device; and
  determining the communication performance between the visible light signal receiving device and the at least one visible light signal transmit device at least according to the evaluation indicator comprises:
  determining the reduction in the communication performance in response to that the bit error ratio increases, or an increment of the bit error ratio exceeds a fifth threshold, or the bit error ratio exceeds a sixth threshold.

11. The method of claim 7, wherein determining the first logic pixel unit of the image sensor related to the at least one visible light signal transmit device at least according to the visible light signal received by each first logic pixel unit of the image sensor comprises:
  determining the first logic pixel unit of the image sensor related to the at least one visible light signal transmit device at least according to the determined visible light signal.

12. The method of claim 7, wherein determining the first logic pixel unit of the image sensor related to the at least one visible light signal transmit device at least according to the visible light signal received by each first logic pixel unit of the image sensor comprises:
  determining that at least one first logic pixel unit by which the visible light signal being not able to obtain a modulating signal by the demodulating is the first logic pixel unit of the image sensor related to the at least one visible light signal transmit device.

13. A computer readable storage device, comprising at least one executable instruction, which, in response to execution, causes a system comprising a processor to perform operations, comprising:
  determining a communication performance between a visible light signal receiving device and at least one visible light signal transmit device;
  in response to a reduction in the communication performance between the visible light signal receiving device and the at least one visible light signal transmit device, taking a first logic pixel unit of an image sensor related to the at least one visible light signal transmit device as at least two second logic pixel units to read separately, when reading an inductive charge of the image sensor of the visible light signal receiving device, each of the first logic pixel units comprising the at least two second logic pixel units, and each of the at least two second logic pixel units comprising at least one physical pixel unit of the image sensor.

14. The device of claim 13, wherein the operations further comprise:
  determining, at least according to a visible light signal received by each first logic pixel unit of the image sensor, the communication performance between the visible light signal receiving device and the at least one visible light signal transmit device.

15. The device of claim 13, wherein the operations further comprise:
  determining the distance between the visible light receiving device and the at least one visible light signal transmit device; and
  determining the reduction in the communication performance in response to that the distance increases, or an increment of the distance exceeds a seventh threshold, or the distance exceeds an eighth threshold.

16. The device of claim 13, wherein the operations further comprise:
  acquiring the communication performance between the visible light signal receiving device and the at least one visible light signal transmit device.

17. A visible light signal receiving device, comprising the computer readable storage device of claim 13.

18. The device of claim 14, wherein the operations further comprise:
  demodulating a visible light signal received by each first logic pixel unit of the image sensor;
  for each of the first logic pixel units, in response to being able to obtain a modulating signal by the demodulating, determining a visible light signal from the at least one visible light signal transmit device and determining the communication performance between the visible light signal receiving device and the at least one visible light signal transmit device at least according to the determined visible light signal; and
  for each of the first logic pixel unit, in response to being not able to obtain a modulating signal by the demodulating, determining the reduction in the communication performance between the visible light signal receiving device and the at least one visible light signal transmit device.

19. The device of claim 17, wherein the visible light signal receiving device further comprises:
  the image sensor; and
  the operations further comprise reading an inductive charge of the image sensor under control of the computer readable storage device.

20. The device of claim 18, wherein the operations further comprise:
  determining at least one evaluation indicator of the communication performance at least according to the visible light signal; and
  determining the communication performance between the visible light signal receiving device and the at least one visible light signal transmit device at least according to the evaluation indicator.

21. The device of claim 18, wherein the operations further comprise:
  determining a first logic pixel unit of the image sensor related to the at least one visible light signal transmit device at least according to the visible light signal received by each first logic pixel unit of the image sensor.

22. The device of claim 20, wherein the evaluation indicator comprises: the size of a light spot projected by the at least one visible light signal transmit device on the image sensor; and the operations further comprise determining the reduction in the communication performance in response to that the size of the light spot decreases, or a reduction amount of the size of the light spot exceeds a first threshold, or the size of the light spot is smaller than a second threshold.

23. The device of claim 20, wherein the evaluation indicator comprises: the signal-to-noise ratio of the visible light signal received by the visible light signal receiving device from the at least one visible light signal transmit device; and the operations further comprise determining the reduction in the communication performance in response to that the signal-to-noise ratio decreases, a reduction amount of the signal-to-noise ratio exceeds a third threshold, or the signal-to-noise ratio is less than a fourth threshold.

24. The device of claim 20, wherein the evaluation indicator comprises: the bit error ratio of the visible light signal received by the visible light signal receiving device from the at least one visible light signal transmit device; and the operations further comprise determining the reduction in the communication performance in response to that the bit error ratio increases, or an increment of the bit error ratio exceeds a fifth threshold, or the bit error ratio exceeds a sixth threshold.

25. The device of claim 21, wherein the operations further comprise:

determining the first logic pixel unit of the image sensor related to the at least one visible light signal transmit device at least according to the visible light signal.

26. The device of claim 21, wherein the operations further comprise:

determining that at least one first logic pixel unit by which the visible light signal being not able to obtain a modulating signal by the demodulating is received is the first logic pixel unit of the image sensor related to the at least one visible light signal transmit device.

27. A device for visible light signal receiving and control comprising a processor and memory, wherein the memory storing a computer executable instruction, the processor being connected with the memory via a communication bus, and when the device is operating, the processor executes or facilitates execution of the executable instructions stored by the memory:

determining a communication performance between a visible light signal receiving device and at least one visible light signal transmit device;

in response to a reduction in the communication performance between the visible light signal receiving device and the at least one visible light signal transmit device, taking a first logic pixel unit of an image sensor related to the at least one visible light signal transmit device as at least two second logic pixel units to read separately, when reading an inductive charge of the image sensor of the visible light signal receiving device, each of the first logic pixel units comprising at least two second logic pixel units, and each of the at least two second logic pixel units comprising at least one physical pixel unit of the image sensor.

* * * * *